United States Patent [19]

Goto et al.

[11] Patent Number: 4,831,615
[45] Date of Patent: May 16, 1989

[54] DUAL DIFFERENTIAL OPTICAL SYSTEM MOVING APPARATUS

[75] Inventors: Masao Goto; Hideaki Hayashi, both of Shirakawa, Japan

[73] Assignee: Nippon Columbia Co., Ltd., Tokyo, Japan

[21] Appl. No.: 823,330

[22] Filed: Jan. 28, 1986

[30] Foreign Application Priority Data

| Jan. 30, 1985 | [JP] | Japan | 60-15844[U] |
| Jan. 30, 1985 | [JP] | Japan | 60-15845 |
| Mar. 18, 1985 | [JP] | Japan | 60-53993 |
| Mar. 25, 1985 | [JP] | Japan | 60-60200 |
| Mar. 25, 1985 | [JP] | Japan | 60-60201 |
| May 29, 1985 | [JP] | Japan | 60-80244 |

[51] Int. Cl.⁴ ......................................... G11B 21/02
[52] U.S. Cl. ........................................ 369/223; 369/32; 369/219; 369/244; 369/249; 360/106; 318/577; 318/625
[58] Field of Search ........................... 369/32-33, 369/43, 44, 78, 219, 221, 244, 223, 249; 360/86, 97-99, 104-107; 350/6.1, 6.3; 318/575-577, 625, 640, 7-9, 14, 15; 310/40 MM

[56] References Cited

U.S. PATENT DOCUMENTS

| 2,144,625 | 1/1939 | Herman | 369/221 X |
| 3,643,036 | 2/1972 | Takashima et al. | 360/106 X |
| 3,720,924 | 3/1973 | Aagard | 369/44 X |
| 3,749,827 | 7/1973 | Kinjo et al. | 360/106 |
| 3,975,769 | 8/1976 | King | 360/105 X |
| 4,123,147 | 10/1978 | Hill et al. | 360/107 X |
| 4,330,880 | 5/1982 | Van Dijk | 369/32 |
| 4,423,449 | 12/1983 | Hasegawa | 360/105 X |
| 4,429,488 | 2/1984 | Wessels | 310/40 MM X |
| 4,442,516 | 4/1984 | Funabashi | 369/43 |
| 4,482,829 | 11/1984 | Tardieu et al. | 310/40 MM X |
| 4,514,837 | 4/1985 | Van Rosmalen | 360/106 X |
| 4,590,529 | 5/1986 | Nikaido et al. | 360/106 |
| 4,609,959 | 9/1986 | Rudi | 360/105 X |
| 4,613,967 | 9/1986 | Hamada et al. | 369/219 X |
| 4,636,874 | 1/1987 | Hoogendoorn et al. | 360/77 X |
| 4,692,999 | 9/1987 | Frandsen | 360/106 X |

Primary Examiner—Alan Faber
Assistant Examiner—W. R. Young
Attorney, Agent, or Firm—Hill, Van Santen, Steadman & Simpson

[57] ABSTRACT

An optical system moving apparatus having first and second driving motors, transmitting screws coupled to the first and second driving motors, and a moving table on which an optical system is mounted and which is coupled through the transmitting screws to the first and second driving motors, wherein the moving table is driven by a combined output of the first and second driving motors.

13 Claims, 11 Drawing Sheets

DUAL DIFFERENTIAL OPTICAL SYSTEM MOVING APPARATUS

BACKGROUND OF THE INVENTION

1. Field of the Invention

This invention relates generally to a pick-up feeding or moving mechanism for use with a servo drive apparatus and more particularly to a drive circuit and a moving apparatus in which a mechanism for stably feeding a pick-up at high or low speed is formed of a differential transmission system.

2. Description of the Prior Art

A variable range in which a playback optical pick-up used in an optical disc reproducing apparatus or the like can be moved is very large. On the other hand, the track pitch between the tracks on the optical disc is selected to be about 1.6 $\mu$m, and in a so-called compact disc (CD) and so on, the revolution speed thereof is low, and the feeding pitch or length of the optical pick-up is very slow such as about 10 $\mu$m per second. Therefore, when the pick-up is stably driven by a motor, the deceleration ratio thereof must be selected to be large. On the other hand, when a desired position on the disc is accessed at high speed, the pick-up must be moved at high speed. For example, when the pick-up is moved at, for example, 10 cm per second, this speed has a difference of $10^4$ times that upon the playback mode. To this end, in order to make a normal playback stable, the slow response must be made and hence the deceleration ratio must be selected large. If the deceleration ratio is small, the movement of the pick-up becomes discontinuous due to the uneven actuation of a drive motor and an initial actuation voltage is needed until the motor begins to rotate. Further, due to the change from the static friction to the dynamic friction of the motor, there is caused a hysteresis characteristic and the like, so that it is difficult to carry out the slow servo. On the contrary, when the motor is decelerated in response to the high speed feeding, the motor rotation becomes very low in the normal playback mode so that the driving voltage becomes substantially equal to or less than the actuation voltage. Thus, the motor is repeatedly stopped and actuated and thereby driven unstably.

In order to remove such problems, the prior art transmission system is constructed as shown in FIG. 1. Referring to FIG. 1, in the normal playback mode, a motor M2 is provided with a large deceleration gear G and rotates, through a clutch C2, a screw 1, which rotates an optical pick-up PU, so that the motor M2 is rotated in the system formed of an input voltage VE, a movable contact a of a switch S, its fixed terminal c, a driving amplifier A2 and the motor M2, while the clutch C2 is operated by the system formed of a voltage supply source E, another movable contact $a_1$ of the switch S, its fixed contact $c_1$ and the clutch C2 to thereby move the optical pick-up PU as a load. Whereas, in the case of high speed mode, the switch S is changed in position, the clutch C2 is made inoperable and a motor M1 is driven through a driving amplifier A1 by the input voltage VE so that the screw 1 can be rotated at high speed and hence the optical pick-up PU can be moved at high speed. When switchably changing the high speed and low speed, the mechanical clutch C2 is required and this makes the moving apparatus complicated in construction. Further, the clutch C2 produces an operation noise and the like, furthermore, the accuracy and precision upon assembly must be increased.

OBJECTS AND SUMMARY OF THE INVENTION

Accordingly, it is a general object to provide an improved optical pick-up or system feeding or moving mechanism which can stably move the optical pick-up both at high and low speeds without using a mechanical clutch.

An object of this invention is to provide an improved optical system moving apparatus with a servo apparatus in which the reduction ratio can be varied by adjusting a variable resistor and which can provide an optimum servo characteristic.

Another object of this invention is to provide an optical system moving apparatus in which when an optical pick-up is moved, it is possible to prevent the optical pick-up from being moved discontinuously by a voltage applied to a motor.

Still another object of this invention is to provide an optical system moving apparatus in which a driving device is supported in a cantilever fashion to thereby make the assembly of the driving device easy.

Yet another object of this invention is to provide an optical system moving apparatus in which the moving speed of an optical pick-up can be freely set by controlling only the revolution speed of a motor.

A further object of this invention is to provide an optical system moving apparatus in which a stepping motor is used as a drive source and an optical pick-up can be moved at high or low speed only by changing the driving pitch of the stepping motor.

A further object of this invention is to provide an optical system moving apparatus in which one of two drive sources is mounted to a moving base table on which an optical pick-up is mounted to thereby reduce the spacing of the apparatus from a standpoint of plan representation.

Still a further object of this invention is to provide an optical system moving apparatus in which even when two drive motors are scattered in characteristic, a second motor is servo-controlled by a detecting output resulted by detecting the revolution speed of a first motor, so as to make up such scattering.

Yet further object of this invention is to provide an optical system moving apparatus in which a movable base table is moved by a single endless belt so that the movable base table can be moved without uneven driving.

According to one aspect of the present invention, there is provided an optical system moving apparatus comprising:

(a) first and second driving means;

(b) transmitting means coupled to said first and second driving means; and (c) a moving table on which an optical system is mounted and which is coupled through said transmitting means to said first and second driving means, wherein said moving table is driven by a combined output of said first and second driving means.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFRRRED EMBODIMENTS

Now, the present invention will hereinafter be described with reference to the drawings.

Figure 1:
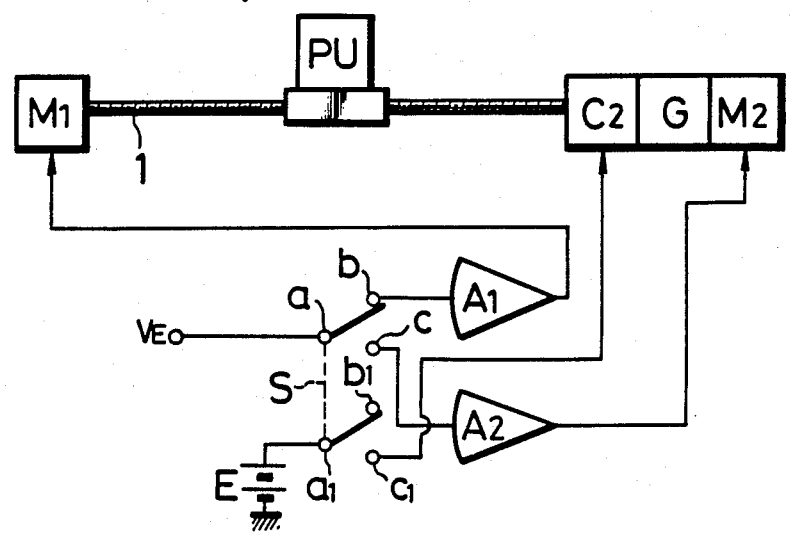
FIG. 1 is a schematic diagram showing a construction of a driving system of a prior art apparatus for moving an optical system.
Figure 2:
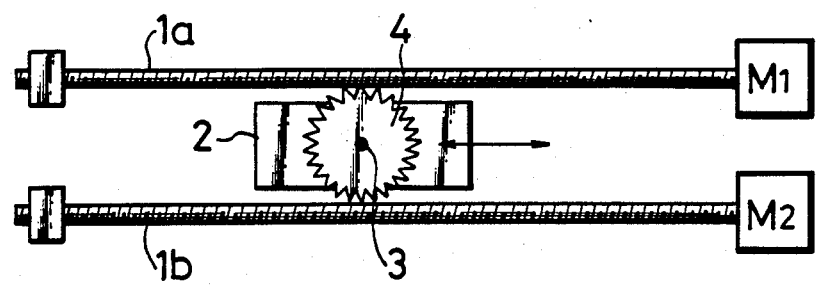
FIG. 2 is schematic diagram showing a construction of an embodiment of an optical system moving apparatus according to this invention from a principle standpoint.

FIG. 2 is a schematic diagram showing a construction of an embodiment of an optical system moving apparatus according to the present invention from a principle standpoint. Referring to FIG. 2, the rotations of first and second motors M1 and M2 are respectively transmitted to screws 1a and 1b such as a worm and the like. These two screws 1a and 1b are constructed such that the rotation directions and revolution speeds thereof can be varied freely. The afore-described screws 1a and 1b are meshed with a gear externally toothed on the outer periphery of a worm gear wheel 4 and a rotary shaft 3 of the worm gear wheel 4 is rotatably pivoted to a movable bsse table 2. On the movable base table 2, there is installed an optical pick-up though not shown.

Figure 3:
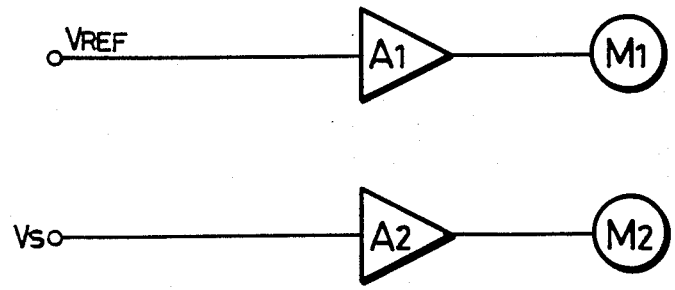
FIG. 3 is a systematic diagram showing a principle of a driving circuit for the apparatus shown in FIG. 2.

FIG. 3 is a schematic diagram illustrating a principle of a driving circuit for the above moving apparatus. Referring to FIG. 3, a constant bias voltage $V_{REF}$ is applied through a driving amplifier A1 to the first motor M1; while an input voltage Vs for movable servo-control is applied through the driving amplifier A2 to a second motor M2. In this case, when the movable base table 2 is stopped moving, one motor is rotated and the other motor is rotated in the direction so as to cancel the rotation of one motor to thereby stop the moving of the movable base table 2. Therefore, even in the feeding of the table 2 at a very slow speed, the motor can always be rotated at a predetermined revolution speed or more. Thus, it is possible to remove a jogging, a hysteresis of the starting voltage, a dead point and so on, unlike the prior art; hence, the smooth feeding servo-control becomes possible. In this case, if the polarity and the magnitude of the bias voltage $V_{REF}$ are varied, it is possible to vary the bias, revolution speed and rotation direction of the motor.

Figure 4A:
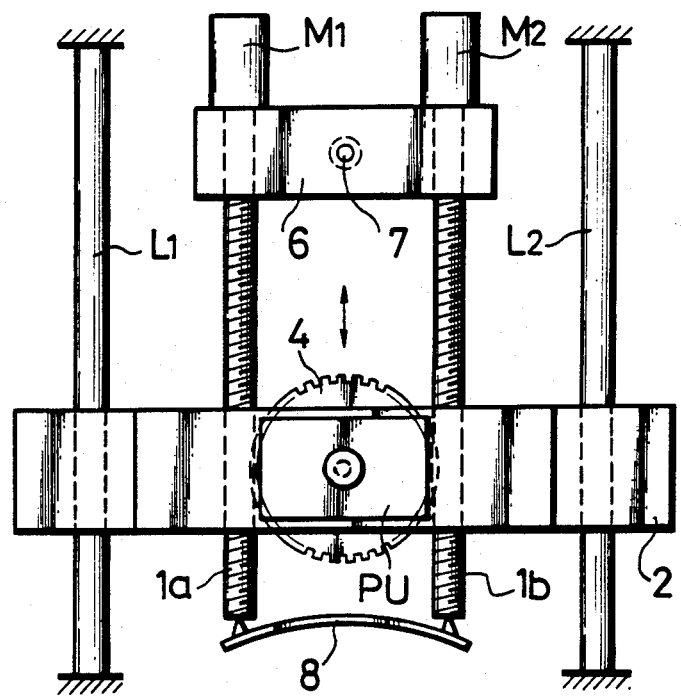
FIG. 4A is a plan view showing a practical construction of other embodiment of the optical system moving apparatus according to this invention.
Figure 4B:
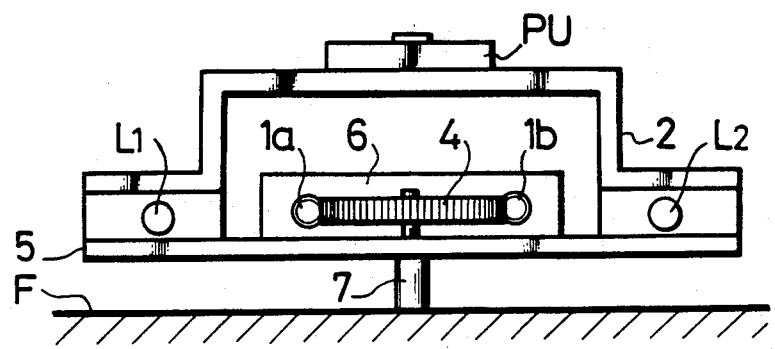
FIG. 4B is a side view of FIG. 4A partially removed.
Figure 5:
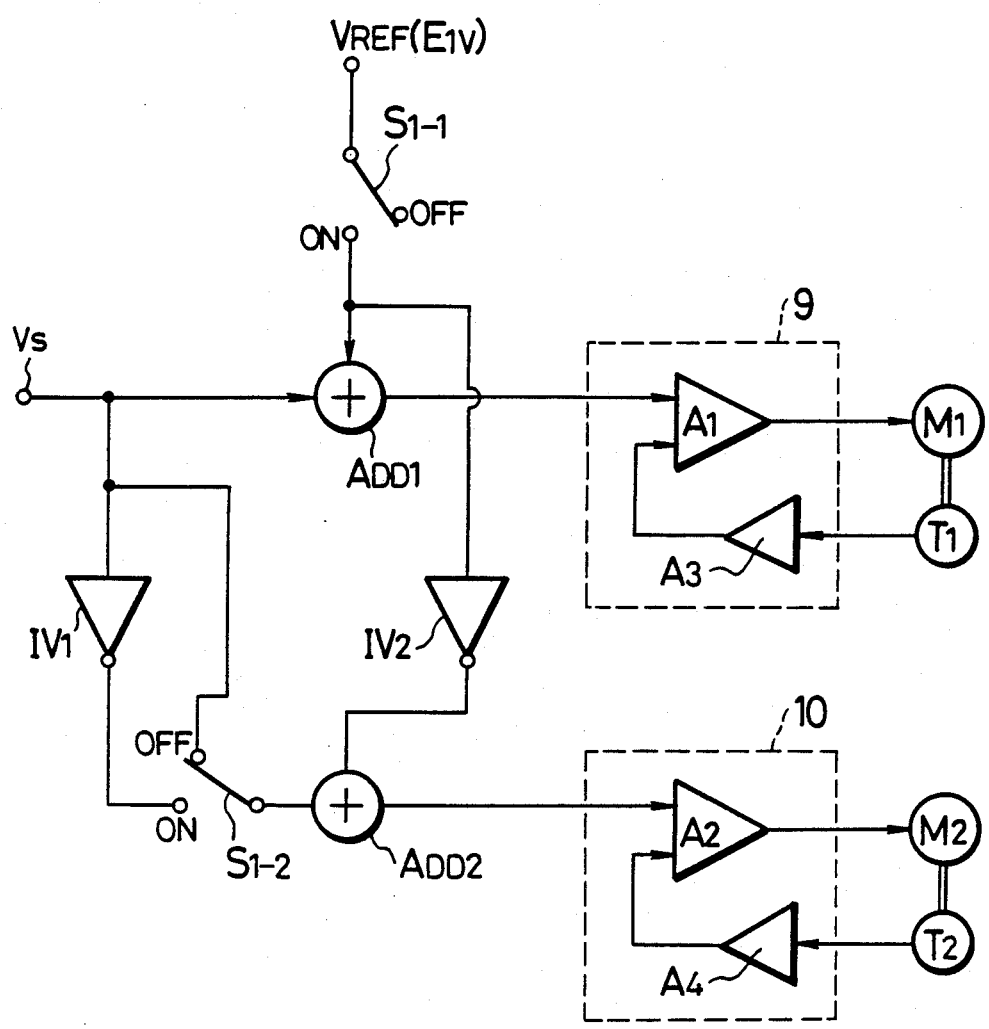
FIG. 5 is a circuit diagram showing a practical circuit arrangement of a driving circuit for the optical system moving apparatus shown in FIGS. 4A and 4B.

FIGS. 4A and 4B are a plan view and a side view showing a practical construction of an embodiment of an optical pick-up moving apparatus according to the present invention. FIG. 5 is a circuit diagram showing in detail a practical circuit arrangement of a drive circuit used in the optical pick-up moving apparatus of FIGS. 4A and 4B.

Referring to FIGS. 4A and 4B, the movable base table 2 having an optical pick-up PU is arranged so as to be movable along two rails L1 and L2 in the up and down direction in FIG. 4A. The movable base table 2 is formed as a substantially inverse dish shape in cross section (refer to FIG. 4B) and is formed integrally with a gear mounting portion 5 of substantially plate shape opposing to the movable base table 2 and on which the worm gear wheel 4 is mounted so as to become freely rotatable so that the movable base table 2 can be moved along the two rails L1 and L2. One end of each of the first and second screws 1a and 1b is rotatably pivoted to a drive base portion 6 so as to grip therebetween the worm gear wheel 4 and the first and second screws 1a and 1b are rotated by the first and second motors M1 and M2. The drive base portion 6 is pivotably planted on a fixed portion F such as a chassis or the like around a supporting point 7 in a cantilever fashion. The ends of the first and second screws 1a and 1b are bridged by a spring 8 so as to be free.

FIG. 5 is a systematic block diagram showing a circuit arrangement of the drive circuit for driving the first and second motors M1 and M2 shown in FIGS. 4A and 4B. Referring to FIG. 5, motor drive circuits 9 and 10 are respectively formed of drive amplifiers A1, A2 and feedback amplifiers A3 and 44. The outputs from the first and second drive amplifiers A1 and A2 are used to drive the first and second motors M1 and M2 respectively so that the motors M1 and M2 are servo-controlled at the constant revolution speed. The first and second motors M1 and M2 are provided with direct-coupled type generators such as tachogenerators T1 and T2. The outputs from the tachognnerators T1 and T2 are respectively supplied through the feedback amplifiers A3 and A4 and so on to the first and second motors M1 and M2 to control the same. Under the state that first and second switches S1-1 and S1-2 are turned off, a servo input voltage Vs is applied through first and second adding circuits ADD1 and ADD2 to the drive amplifiers A1 and A2 whereby the first and second motors M1 and M2 are driven to rotate. In this case, since the first and second motors M1 and M2 are supplied with the servo input voltage Vs of the same phase, the movable base table 2 is moved at high speed, thus realizing, for example, the accessing.

In order to realize the normal recording or playback mode, when the switches S1-1 and S1-2 are both turned on, a bias voltage $E_{1V}$ from a bias voltage source $V_{REF}$ and a bias voltage Vs are added at the adding circuit ADD1 and then constant bias voltage E is applied to the first motor M1 through the driving circuit 9, while the bias voltage $E_{1V}$ from the bias voltage source $V_{REF}$ passed through a second inverting circuit IV2 and the servo input voltage Vs passed, through a first inverting circuit IV1 are added at the second adding circuit ADD2 and then supplied through the driving circuit 10 to the second motor M2 as a bias voltage $-E$.

As a result, the first and second motors M1 and M2 are rotated in the opposite direction thus to place the movable base table 2 in the stopped state.

At this time, the servo input voltgge Vs is directly applied to the drive amplifier A1 of the drive circuit 9; while it is supplied to the second drive amplifier A2 of the drive circuit 10 via the first inverting circuit IV1. When the gain of the first inverting circuit IV1 is "$-1$", even if the servo input voltage Vs is increased, although the first and second motors M1 and M2 are increased in speed in the opposite direction to each other to rotate, the movable base table 2 does not move. If the gain of the first inverting circuit IV1 is selected to be, for example, 0.9, the movable base table 2 is moved by this difference amount so that the moving speed of the movable base table 2 is presented so as to satisfy the condition of $V = Vs - 0.9\ Vs = 0.1\ Vs$ relative to the servo input voltage Vs. Thus, the gain of the first inverting circuit IV1 becmmes 1/10 and hence the movable table 2 can be moved.

According to the construction of the present invention as shown in FIGS. 4A and 4B, since movement of the movable base table 2 due to the voltage upon actuation of the motor does not occur and also the apparatus is constructed in a cantilever fashion, it becomes possible to prevent the worm wheel from being meshed with the worm gear too much by the attaching error of the screws 1a and 1b.

Figure 6:
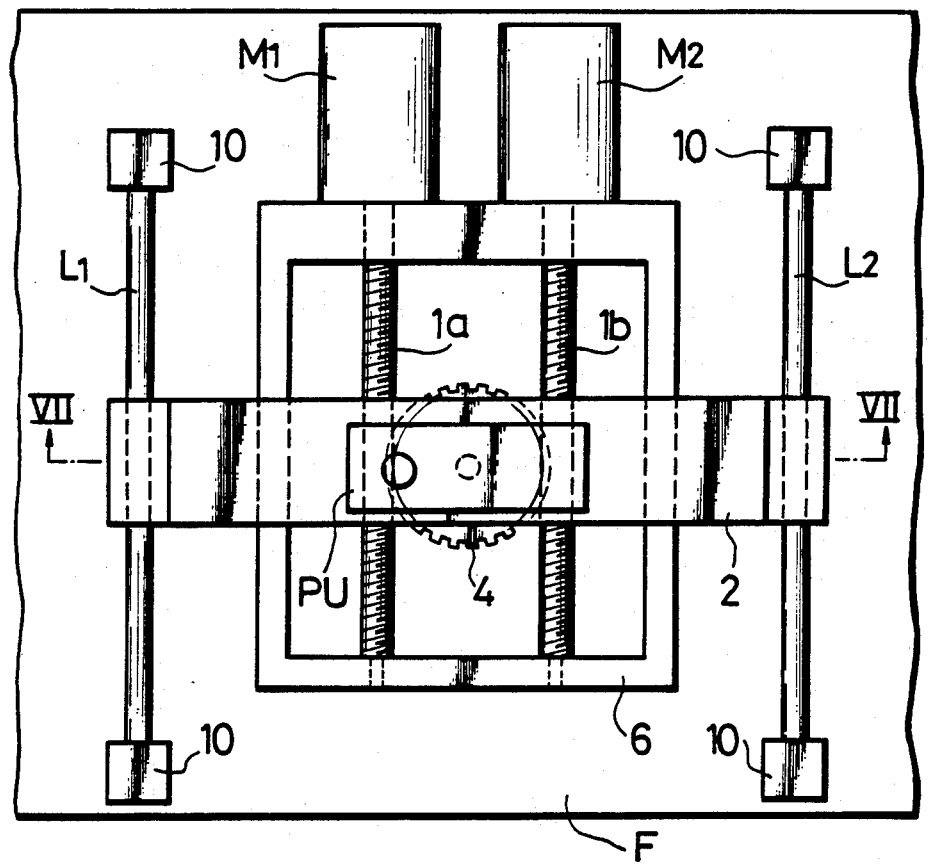
FIG. 6 is a plan view illustrating other embodiment of the optical system moving apparatus according to the present invention.
Figure 7:
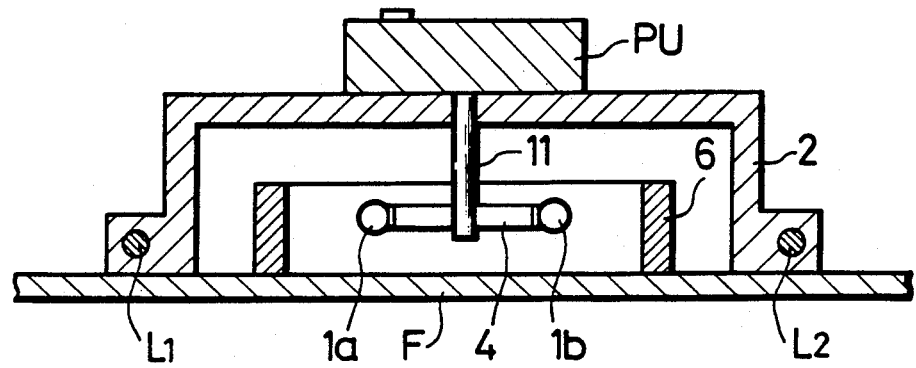
FIG. 7 is a cross-sectional side view taken along a line VII to VII of FIG. 6.

While in the above mentioned embodiment the screws are supported a the cantilever fashion, alternatively, it is unnecessary that they are supported in cantilever fashion as shown in FIGS. 6 and 7.

FIG. 6 is a plan view showing other embodiment of the optical system moving apparatus according to the present invention and FIG. 7 is a cross-sectional view taken along a line VII to VII of FIG. 6. Referring to FIG. 6, the drive base portion 6 may be formed as a hollow square shape or frame shape and this drive base portion 6 is fixed to the fixed portion F such as the chassis or the like. The screws 1a and 1b are rotatably supported by the opposing sides of the frame shape drive base portion 6. Similarly, the rails L1 and L2 may be fixed to the fixed portion F at their both ends through bearings 10 and the movable base table 2 of inverse dish shape is mounted on the rails L1 and L2 freely slidable. The optical pick-up PU is mounted on the movable base table 2 and the worm gear wheel 4 is pivotably supported by a shaft 11 that is implanted on the movable base table 2. If the optical pick-up system moving apparatus of the invention is constructed as described above, the optical pick-up apparatus is used as a portable type and under the state that it is placed in the longitudinal or horizontal direction, the recording and reproducing can be carried out. Other elements are similar to those of FIGS. 4A and 4B and they will not be described.

A construction of another embodiment of the present invention will be described with reference to FIGS. 8 and 9.

According to this construction, motors are respectively coupled to the differential inputs of the differential transmission apparatus and in order to move the optical pick-up EU which becomes the load by the combined output, difference generating means is directly provided on the movable base table whereby to increase the reliability.

Figure 8:
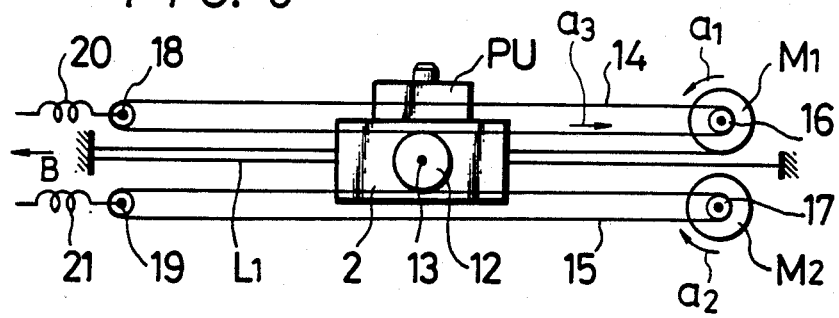
FIG. 8 is a schematic side view illustrating other embodiment of the optical system moving apparatus according to the present invention.
Figure 9:
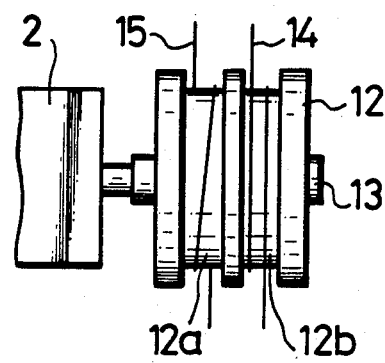
FIG. 9 is a plan view showing a main part of FIG. 8.

FIG. 8 is a schematic diagram showing a feeding mechanism of the optical pick-up system moving apparatus and FIG. 9 is a plan view showing a pulley portion used in the apparatus shown in FIG. 8. The optical pick-up apparatus PU is fixed to the movable base table 2 and the movable base tbble 2 can be slid along a single guide rail L1 that is supported between the fixed portions. This movable base table 2 is provided with a rotary pulley 12 shown in FIG. 9. As FIG. 9 shows, the rotary pulley 12 is rotatably pivoted to a shaft 13 that is projected from the movable base table 2 and is formed of first and second drums 12a and 12b which are the same in diameter. Wires 14 and 15 are wound around the first and second drums 12a and 12b, respectively. In other words, one end of the wire 14 is wound around a pulley 16 that is fixedly engaged with the rotary shaft of the first motor M1, further wound around a pulley 18 that is placed in the opposite side to the first motor M1 and is then connected to the other end of the wire 14 wound around the drum 12b in endless manner. One end of the other wire 15 is wound around a pulley 17 that is fixedly engaged with the rotary shaft of the second motor M2, further wound around a pulley 19 that is placed in the opposite side to the second motor M2 and is then connected to the other end of the wire 15 wound around the first drum 12a in endless manner. To give a tension to each of the above mentioned wires 14 and 15, springs 20 and 21 are respectively interposed between the rotayy shafts of the pulleys 18, 19 and the outer fixed portions, whereby the pulleys 18 and 19 are respectively biased in the direction shown by an arrow B in FIG. 8 and thereby tensioned. In consequence, the pulleys 18 and 19 can be freely moved in the axis direction of the rail L1.

According to the construction as mentioned above, if the pulleys 16 and 17 are also equal to each other in diameter, the pulleys 18 and 19 are equal to each other in diameter and the first and second motors M1 and M2 are rotated in the same direction, the pulley 12 is rotated relative to the rotary shaft 13 and the movable base table 2 is not moved along the rail L1 in either of the right and left directions. If now the first and second motors M1 and M2 are rotated at the same revolution number and in the opposite directions as shown by arrows a1 and a2 in FIG. 8, the movable base table 2 is moved at the speed same as those of the wires 14 and 15 in the right-hand direction a3 in FIG. 8. That is, the moving speed V' of the movable base table 2 is expressed as follows:

$$V' \propto VM1 - VM2 \qquad (1)$$

where VM1 is the revolution speed of the first motor M1 and VM2 is the revolution speed of the second motor M2.

If the rotary direction of the second motor M2 is taken as positive when its rotation direction is opposite to that of the first motor M1, the following expression (2) is satisfied $$V' \propto VM1 + VM2 \qquad (2)$$

Thus, the moving speed V' becomes equal to the sum of the revolution speeds of both the first and second motors M1 and M2. If the moving speed V' of the movable base table 2 is constant, both the first and second motors M1 and M2 must be operated in a differential fashion. Consequently, if both the first and second motors M1 and M2 are rotated at the same revolution speed, the movable base table 2 is moved at the fastest speed and thus becomes equal to the moving speed of the wires 14 and 15. If now the second motor M2 is rotated in the same rotary direction as that of the first motor M1 and the first motor M1 is rotated at the revolution speed 90% of that of the second motor M2, VM1+VM2 becomes equal to 1+1=2 with respect to the former, while it becomes equal to 1−0.9=0.1 with respect to the latter. Hence, the moving speed V' of the latter becomes 1/20 of the former. If the revolution ratio between both the motors is selected to be 99%, the moving speed V' becomes equal to 1/200.

Another example of such driving circuit will be described with reference to FIG. 10.

Figure 10:
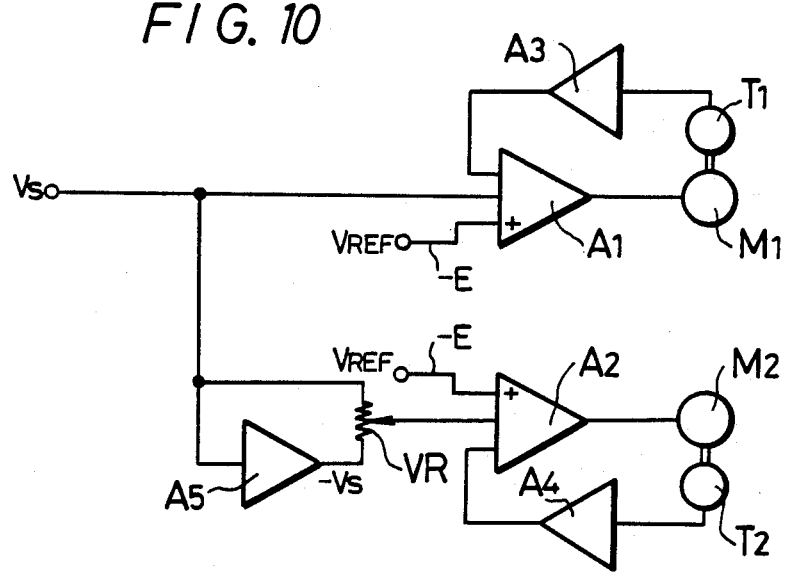
FIG. 10 is a circuit diagram showing a motor driving circuit used in other embodiment of the optical system moving apparatus according to the present invention.

Referring to FIG. 10, the first and second motors M1 and M2 are respectively provided with the first and second tachogenerators T1 and T2. The outputs from the first and second tachogenerators T1 and T2 are respectively supplied through the feedback amplifiers A3 and A4 to the drive amplifiers A1 and A2, whereby the first and second motors M1 and M2 are driven to rotate. As a result, the first and second motors M1 and M2 are servo-controlled to rotate at the revolution speed proportional to the servo input voltage Vs. Alternatively, when the first and second tachogenerators T1 and T2 and the first and second feedback amplifiers A3 and A4 are not provided, if, for example, a DC motor is used as the first and second motors M1 and M2, since the revolution speeds thereof are made corresponding to the applied voltages thereto such tachogenerators 'and 'and the feedback amplifiers A3 and A4 can be omitted. Also in the example, as FIG. 10 shows, which employs the first and second tachogenerators T1 and T2 or the feedback amplifiers A3 and A4, the servo input voltage Vs is supplied through an inverting amplifier A5 to the drive amplifier A2. In other words, the inverting amplifier A5 generates a reverse voltage −Vs of the servo input voltage Vs. Between this reverse voltage −Vs and the servo input voltage Vs, there is inserted a variable resistor VR and the output from the slider member of the variable resistor VR is supplied to the drive amplifier A2. If, now, the slider member of the variable resistor VR is moved to the full end of the servo input voltage Vs side, the equal voltage Vs is applied to the first and second motors M1 and M2 so that the revolution speeds thereof become equal to each other. On the contrary, if the slider member of the variable resistor VR is moved to the full end of the reverse voltage −Vs side, the first and second motors M1 and M2 are rotated in the opposite direction at an equal revolution speed. Accordingly, the servo-control modes from moving the movable base table 2 at maximum speed to stopping the same can freely be set by using the variable resistor VR, also including the deceleration ratio. More specifically, the moving speed V' of the optical pick-up PU relative to the servo input voltage Vs can be varied by the variable resistor VR with the result that the revolution speeds of the first and second motors M1 and M2 which are used to servo-control the optical pick-up PU to move, can be set electrically. As a result, during playback mode, the revolution speeds of the first and second motors M1 and M2 are set to be proper ones, while upon fast-forward mode, the position of the slider member of the variable resistor VR is varied to thereby move the movable base table 2 at high speed.

If instead of the above mentioned variable resistor VR a field effect transistor (FET), operating as an electrical variable resistor element, is used as the variable resistor element, it becomes possible to freely vary the deceleration ratio. Further, if a bias voltage −E is applied from a bias voltage source $V_{REF}$ to the drive amplifiers A1 and A2, when there is no servo input voltage Vs, both the first and second motors M1 and M2 are rotated at the constant revolution speed in a differential fashion to thereby stop the movable base table 2 from being moved. Then, it is possible to remove the influence of hysteresis caused when the motors M1 and M2 are actuated or started.

While in the embodiment shown in FIGS. 8 to 10 the wires 14 and 15 are wrapped around the drums 12a and 12b of the pulley 12 at a wrapping angle of 360°, the wrapping angle is not limited to the above but may be selected to be 180°. Alternativelty, they may be constructed as shown in FIG. 11.

Figure 11:
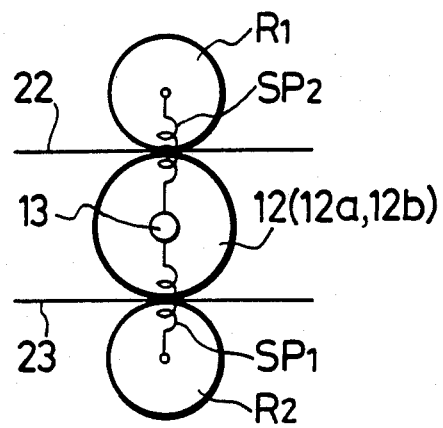
FIG. 11 is a schematic side view illustrating other embodiment of a pulley according to the present invention.

That is, in the illustrative example of FIG. 11, instead of the wires 14 and 15, there are employed flat belts 22 and 23 and the flat belts 22 and 23 are made in contact with the drums 12a and 12b of the pulley 12. At the same time, there are employed tension rollers R1 and R2 between which and the drums 12a and 12b the flat belts 22 and 23 are respectively gripped. Reference numerals SP1 and SP2 designate bias springs which are used to urge the tension rollers R1 and R2 against the drums 12a and 12b of the pulley 12, respectively. If the feeding mechanism of the invention is constructed as described above, the driving force can be provided as a friction force.

According to the feeding mechanism as described above, by controlling the revolution numbers of the motors, it is possible to obtain a pick-up moving apparatus which can freely set the moving speed of the movable base table.

Figure 12:
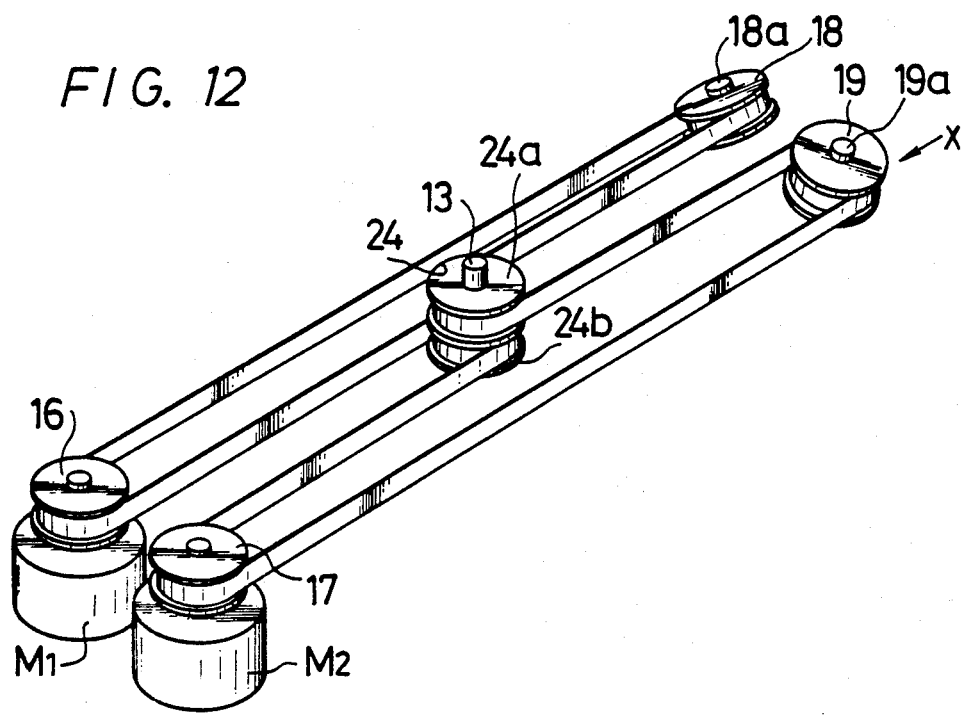
FIG. 12 is a perspective view illustrating a further embodiment of the optical system moving apparatus according to this invention.

A further embodiment of the optical pick-up moving apparatus according to the present invention will be described hereinafter. In this embodiment, a movable roller having the movable base table on which the optical pick-up is placed is provided between fixed rollers having two pairs of driving forces and the optical pick-up is driven in a differential fashion by a single belt extended between the movable roller and two pairs of, or four fixed rollers. FIG. 12 is a perspective view illustrating a differential mechanism of the optical system moving apparatus of the present invention, FIG. 13 is a plan view of FIG. 12 and FIG. 14 is a perspective view illustrating the optical system moving apparatus of the invention from the X direction of FIG. 12.

Figure 13:
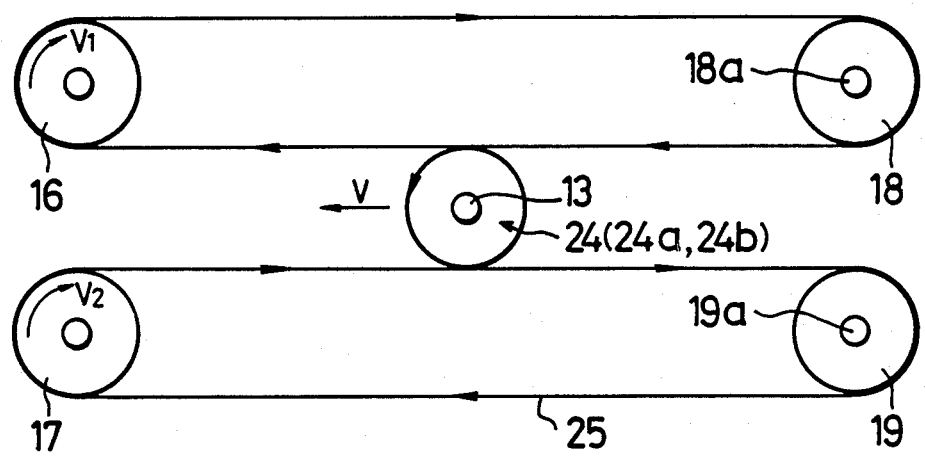
FIG. 13 is a schematic plan view of FIG. 12.
Figure 14:
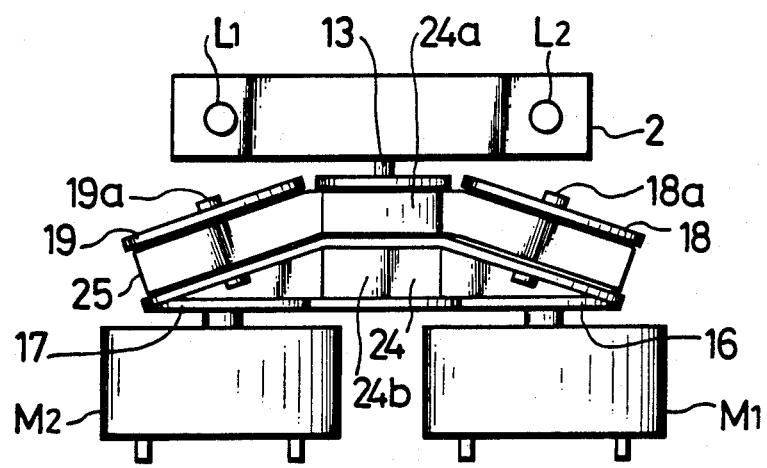
FIG. 14 is a side view seen from the X direction of FIG. 12.

Throughout FIGS. 12 to 14, references M1 and M2 designate first and second motors, respectively. The motors M1 and M2 are both fixed to a chassis (not shown) or the like and pulleys 16 and 17 are engaeed with the drive or rotary shafts of the motors M1 and M2, respectively. Pulleys 18 and 19 are rotatably engaged with shafts 18a and 19a that are implanted slantwise on a chassis (not shown) with the same interval and in opposing relation to the pulleys 16 and 17, respectively. Further, at the intermediate position between the pulley 16, 18 and the pulley 17, 19, there is disposed a double pulley 24 which is rotatably engaged with a rotary shaft 13 implanted on the movable base table 2. This double pulley 24 includes two pulleys 24a and 24b. A single endless belt 25 is extended around these five pulleys 16, 17, 18, 19 and 24. On the movable base table 2, there are placed an optical head and so on though not shown. As FIG. 14 shows, the movable base table 2 is moved together with the pulley 24 along guide rails L1 and L2. The guide rails L1 and L2 are elongated in the direction of, for example, the pulleys 16 and 18.

The above mentioned endless belt 25 is wound around the pulleys as seen in FIG. 13. In other words, the endless belt 25 is extended in such a manner that it may go half round the pulley 16 in the clockwise direction, go half round the pulley 18 in the clockwise direction, go half round the upper side pulley 24a of the pulley 24 in the counter-clockwise direction, go half round the pulley 19 in the clockwise direction and go half round the pulley 17 in the clockwise direction. Then, the endless belt 25 may go half round the lower side pulley 24a of the pulley 24 in the counter-clockwise direction and then return to the pulley 16.

The pulleys 18 and 19 are disposed slantwise such that as will be clear from FIG. 14, the insides thereof become hihh and the outsides thereof become low. Therefore, even when the flat belt 25 is wound around the pulleys 18 and 19, the endless belt 25 wound around the upper and lower pulleys 24a and 24b of the pulley 24 can be prevented from being displaced in position.

With the construction as mentioned above, when the drive motors M1 and M2 are rotated at the same revolution speed and in the same direction, the belt 25 is moved around the pulleys 16 to 19 and 24 and no force is given to the rotary shaft 13 implanted on the movable base table 2 so that the movable base table 2 is set in the stop mode. If, now, one motor M1, for example, is rotated faster than the other motor M2, the peripheral speed of the pulley 16 becomes higher than those of the pulleys 17, 18, 19 and 24 so that the movable base table 2 is moved at a speed having a faster speed, or at a speed ½ the peripheral speed of the pulley 17 as compared with the peripheral speed of the pulley 16 to the left-hand direction in FIG. 13. If, now, the peripheral speed of the pulley 16 is taken as $v_1$ and the peripheral speed of the pulley 17 is taken as $v_2$, a moving speed $V'$ of the movable base table 2 is expressed as $$V' = \tfrac{1}{2}(v_1 - v_2)$$

That is, the movable base table 2 is driven to move by the difference between the revolution speeds of the pulleys 16 and 17. Accordingly, when the optical pick-up placed on the movable base table 2 is intended to be moved very slowly, by rotating the motors M1 and M2 both in the same direction and by making the revolution speeds thereof slightly different from each other, it becomes possible to feed the optical pick-up little by little. Also, since the motors are always rotated, it is possible to prevent the discontinuous portion from being generated when the motor is stopped and then started. Accordingly, the servo characteristic can be increased significantly. Furthermore, the movable base table 2 can be moved at high speed by stopping either of the motors M1 and M2 or by rotating both the motors M1 and M2 in the opposite direction from each other.

While this embodiment employs the flat belt 25, the belt 25 may be formed of square or round belt. At that time, the pulley 18 and 19 may be implanted perpendicularly to the chassis. Further, while in this embodiment a flange is provided between the two pulleys 24a and 24b of the pulley 24, this flange is not always required. Further, in this embodiment, the pulleys 16 and 17 are directly engaged with the motors M1 and M2. Alternatively, a deceleration mechanism formed of pulley and a belt may be interposed between the motors M1, M2 and the pulleys 16, 17 or the motors M1, M2 may be engaged with the pulley 16 (17) and the pulley 19 (18) so that the pulleys are driven to rotate. In addition, in order to give a tension to the belt 25, it is possible that a tension roller or a pulley associated with the belt is pulled by a spring.

According to the embodiment of the invention as described just above, since a single belt is used as a differential driving means, troubles, such as a scatterings in vibration and uneven driving will not occur unlike the gear arrangement so that the optical pick-up can be driven stably. Further, if a resilient material having a predetermined resiliency is used as the belt, it is possible to realize a mechanical filter by which a vibration of the drive motor and so on can be prevented from being transmitted to the movable base table 2.

Subsequently, a further embodiment of the present invention will be described in detail, in which a movable base table on which an optical pick-up is installed is driven by a first motor fixed to a fixed portion and the optical pick-up moving base table 2 is also provided with a second motor which can move the optical pick-up moving base table relative to the fixed portion. Thus, by combining these motors the table can be differentially moved.

Figure 15:
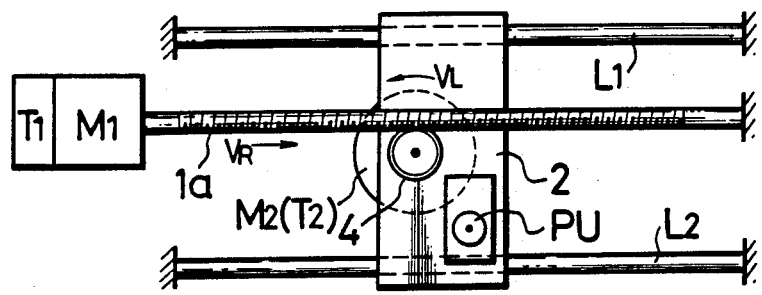
FIG. 15 is a plan view schematically illustrating a further embodiment of the optical system moving apparatus according to the present invention.

FIG. 15 is a cchematic diagram showing a feeding mechanism of the optical pick-up moving apparatus of the invention mentioned just above. Referring to FIG. 15, a movable base table 2 including an optical pick-up PU can be moved along rails L1 and L2 in the right and left direction in the figure, or in the horizontal direction.

A first motor M1 is mounted on a fixed portion such as a chassis or the like and a screw 1a is rotated by the first motor M1. On the other hand, to the movable base table 2 fixed is a second motor M2 to rotate a worm gear wheel 4 which is rotatably supported by the table 2. In this case, the screw 1a and the worm gear wheel 4 are meshed with each other, in which when the worm gear wheel 4, for example, is rotated by the motor M2, the movable base table 2 can be moved in the right and left direction by the screw 1a with the worm gear wheel 4. Further, when the second motor M2 is not rotated but only the first motor M1 is rotated, the movable base table 2 can be moved in the right and left direction by meshing the worm gear wheel 4 with the screw 1a. In this case, if the moving speed (rotation speed) of the screw 1a is taken as VR to the right-hand side direction of FIG. 15 and the peripheral speed of the worm gear wheel 4 which is meshed with the screw 1a is taken as VL in the counter-clockwise direction, a moving speed V' of the movable base table 2 satisfies the condition of $$V' = VR + VL$$

Accordingly, if the first and second motors M1 and M2 are driven as mentioned above, the moving speed V' of the movable base table 2 becomes equal to the sum of the speeds of both the first and second motors M1 and M2 so that it becomes possible to move the movable base table 2 at a very high speed. Whereas, if one motor, for example, the second motor M2 is rotated in opposite direction and its speed is taken as −VL, the moving speed V' of the movable base table 2 satisfies the condition of V'=VR−VL. As a result, although the first and second motors M1 and M2 are rotated, the movable base table 2 is stopped moving. As the electric circuit for this optical pick-up feeding mechanism as mentioned above, it is possible to employ a drive circuit similar to the drive circuit shown in the circuit block diagram of FIG. 5.

Figure 16A:
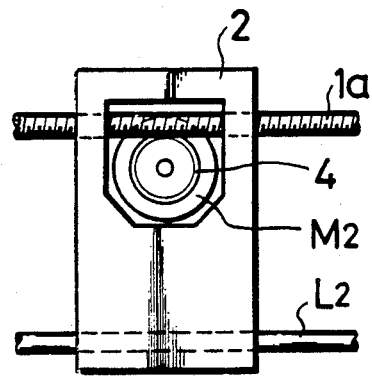
FIG. 16A is a plan view showing a further embodiment of the present invention.
Figure 16B:
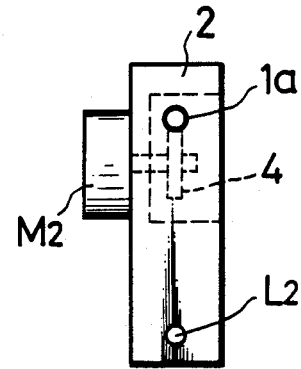
FIG. 16B is a side view of FIG. 16A.

FIG. 16A is a plan view of a movable base table showing a further embodiment of the optical pick-up moving apparatus according to the present invention and FIG. 16B is a side view thereof, in which the screw 1a is used as the rail L1 shown in FIG. 15.

Figure 17:
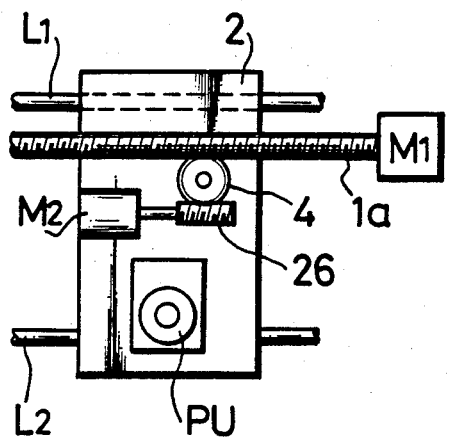
FIGS. 17 and 18 are respectively plan views showing moving sections used in further embodiments of the optical system moving apparatus according to the present invention.
Figure 18:
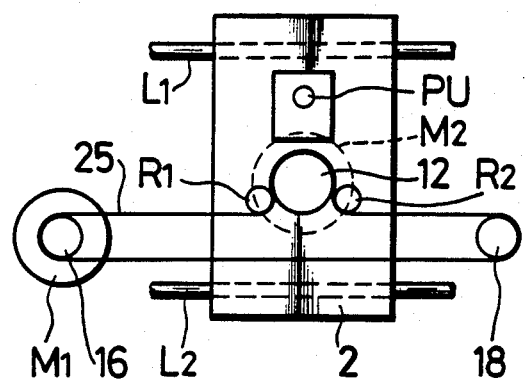

FIG. 17 is a like plan view of a movable base table showing a further embodiment of the present invention in whcch a deceleration screw gear 26 is inserted between hhe second motor M2 and the worm gear wheel 4. FIG. 18 shows a further embodiment of the present invention in which a movable base table 2 is moved by a belt. Referrnng to FIG. 18, instead of the screw 1a of FIG. 16, a pulley 16 is engaged with a rotary shaft of a first motor M1 that is provided on the fixed portion, a pulley 18 is rotatably provided at the position opposite to the pulley 16 along the movable range of the movable base table 2, a pulley 12 is engaged with a rotary shaft of a second motor M2, an endless belt 25 is extended around the pulley 16 of the first motor M1, the pulley 18 and the pulley 12 of the second motor M2 and tension rollers R1 and R2 are provided in the vicinity of the pulley 12 so that the endless belt 25 comes in contact with the pulley 12 over an angular range of 180° or more.

According to the embodiments shown in FIGS. 15 to 18, since the fixed portion and the member to be driven are coupled at one place, a freedom to dispose the optical pick-up is large so that it is possible to obtain an optical pick-up moving apparatus which can remove the defects of unstableness upon stopping.

Though the optical system moving apparatus having the construction shown in FIG. 15 can employ the driving circuit shown in FIG. 5 and the like, this motor drive circuit employs two servo systems so that it becomes very complicated in circuit arrangement. In addition, because the two motors are idependently servo-controlled, the scattering in parts proposes problems. Thus, it becomes necessary to prepare the parts having the same or near characteristic. Therefore, a drive circuit which can remove the above mentioned defects will be described with reference to FIG. 19.

Figure 19:
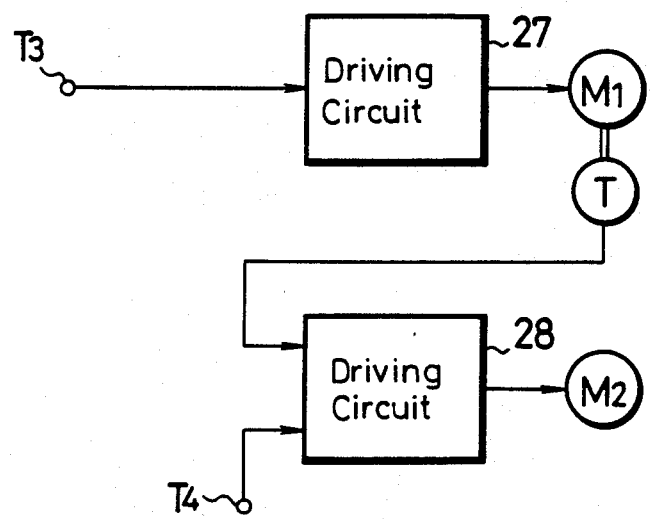
FIG. 19 is a systematic diagram of a driving apparatus of a further embodiment of the optical system moving apparatus according to the present invention.

In FIG. 19, reference letter T3 designates an input terminal to which a motor drive signal is applied. This motor drive signal applied to the terminal T3 is supplied through a first motor drive circuit 27 to a first motor M1 to drive the same. Then, an output from a tachognnerator T which is used to detect the rotation of the first motor M1 is applied to a second driving circuit 28 which controls second motor M2. With this circuit arrangement, in order to carry out the servo-control to satisfy the condition of V'=V1+V2, it is sufficient that a bias voltage to be applied to a terminal T4 is switched such that a plus servo-control is carried out by the second drive circuit 28, while in order to carry out the servo-control to satisfy the condition of V'=V1−V2, it is enough that the bias voltage at the terminal T4 is switched such that a minus servo-control is carried out by the second drive circuit 28.

If the drive circuit is constructed as shown in FIG. 19, it is possible to obtain an excellent drive circuit regardless of the fact that the parts such as the first and second motors M1 and M2 or the like have small scattering in characteristics from a product standpoint.

A further embodiment of the present invention will hereinafter be described with reference to FIG. 20.

Figure 20:
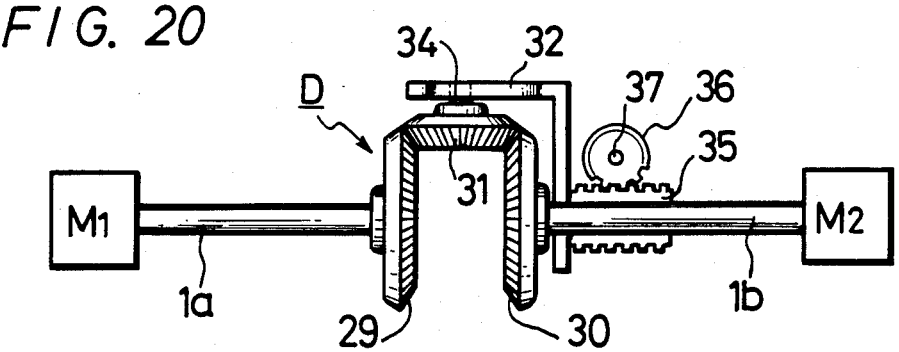
FIG. 20 is a schematic diagram showing a construction of a further embodiment of the optical system moving apparatus according to the present invention.

Referring to FIG. 20, the free end of shafts 1a and 1b coupled with rotary shafts of first and second motors M1 and M2 are respectively fixed with bevel gears 29 and 30. A bevel gear 31 is in mesh with both the bevel gears 29 and 30 and a rotary shaft 34 of the bevel gear 31 is rotatably supported by a rotary bearing 32 of an L-shape so that the bevel gear 31 is operated as a planet gear. Accordingly, if the shafts 1a and 1b are rotated in the same direction and at the same speed, the rotary bearing 32 is rotated together therewith; while, if the screws 1a and 1b are rotated in the opposite direction and at the same revolution number, only the bevel gear 31 is rotated but the rotary bearing 32 is not rotated. A worm 35 is attached to a part of the rotary bearing 32 and rotatably surrounds the screw 16. A worm gear wheel 36 is meshed with the worm 35 and an optical pick-up (not shown) is attached to a load shaft 37 of the worm gear wheel 36.

In general, as shown in FIG. 20, in the differential gear, if U, Z and W are taken as the revolution numbers of the screws 1a and 1b and the load shaft 37, the following equation is established.

$$U + Z = aW \text{ (}a\text{is the constant)}$$

Since the shafts 1a and 1b are coupled with the first and second motors M1 and M2 and the output therefrom is used as the load shaft 37, the combined revolution number of the first and second motors M1 and M2 becomes the output revolution number. Therefore, when the movable base table is moved at a high speed, the first and second motors M1 and M2 are driven at the same phase; while, when the movable base table is moved at a low speed, if one of the first and second motors M1 and M2 is rotated in opposite direction, the output revolution number is decreased. By way of example, if U is taken as 1000 rpm and Z is taken as 900 rpm, W becomes 1900 rpm when $\alpha$ is 1. While, if, now, the second motors M1 is rotated in the opposite direction, $1000-900=100$ is satisfied and thus the output revolution number becomes 1/19. If the rotation directions and the revolution ratio of the two motors are varied as described above, it is possible to obtain a free deceleration ratio electrically.

A further embodiment of the optical system moving apparatus according to the present invention will be described with reference to FIGS. 21 and 22. In this embodiment, a plurality of pulse motors are used to make the feeding pitch of the differential transmitting means different. When the optical pick-up associated with the differential transmitting means is moved with high accuracy, the feeding is made corresponding to the difference between the rotary pulses of the plurality of pulse motors; while, when the optical pick-up is moved at high speed, the optical pick-up is moved at a large pitch by the rotary pulse of one motor of the plurality of pulse motors or a sum of rotary pulses of both of them.

Figure 21:
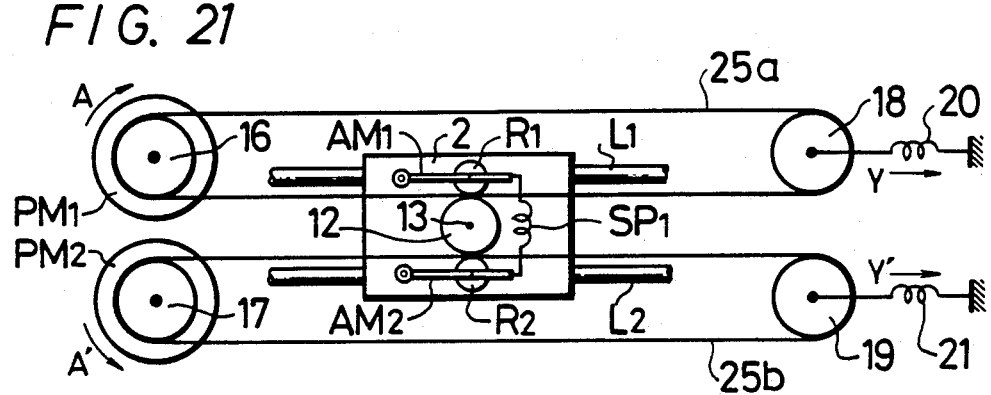
FIG. 21 is a schematic construction diagram of a moving mechanism of a further embodiment of the optical system moving apparatus according to the present invention.

FIG. 21 is a schematic diagram showing the construction of the above-mentioned further embodiment of the optical system moving appatatus according to the present invention.

A movable base table 2 with an optical pick-up mounted thereon is slidably moved along guide rails L1 and L2 in the right and left direction in the figure. To the movable base table 2, there is rotatably attached a pulley 12 at its shaft 13 that is at the center of rotation of the pulley 12. Against the pulley 12, there are urged tension rollers R1 and R2 by a spring SP1 so as to hold belts 25a and 25b therebetween, respectively. The tension rollers R1 and R2 are rotatably pivoted to arms AM1 and AM2 that are also turnably pivoted at their one ends to the movable base table 2. The tension rollers R1 and R2 are made in close contact with the puleey 12 by the spring SP1 extended between the free ends of both the arms AM1 and AM2 such that the belts 25a, 25b and the pulley 12 may be prevented from being slid along with one another. The belt 25a is stretched endlessly between a pulley 16, which is attached to the drive shaft of a first pulse motor PM1, and a pulley 18 provided in the direction opposite to that of the pulley 16. Whereas, the belt 25b is extended endlessly between a pulley 17, which is attached to a drive shaft of a second pulse motor PM2, and a pulley 19 provided in the direction opposite to the pulley 17. Springs 20 and 21 are respectively extended between the rotary shafts of the pulleys 18, 19 and the fixed parts. Thus, the belts 25a and 25b are always biased to the directions shown by arrows Y and Y' in FIG. 21.

The operation of the optical pick-up system moving apparatus constructed as described above will be described. When the second pulse motor PM2 is stopped and the first pulse motor PM1 is rotated in the clockwise direction as shown by an arrow A, the portion of the belt 25a at which it contacts with the pulley 12 is moved in the left-hand direction in the figure so that the pulley 12 is rotated in the counter-clockwise direction. Since the belt 25b is in the stop mode, the center of the rotary shaft 13 of the pulley 12 is moved by half amount of the moved amount of the belt 25a in the left-hand direction. Similarly, when the pulse motor PM1 is stopped and the second pulse motor PM2 is rotated in the direction shown by an arrow A' or in the counter-clockwise direction, the portion ff the belt 25b at which it contacts with the belt 25b is moved in the left-hand direction so that the center of the rotary shaft 13 of the pulley 12 is moved by the half amount of the moved amount of the belt 25b in the left-hand direction. Accordingly, if the portions of both the belts 25a and 25b which contact with the pulley 12 are equally moved in the left-hand direction, the pulley 12 is not rotated and the center of the rotary shaft 13 of the pulley 12, i.e,, the movable base table 2 is moved at the speed equal to those of the belts 25a and 25b in the left-hand direction. Conversely, if the contact portions of both the belts 25a and 25b are moved by the same amount in the directions opposite to each other, the movable base table 2 is not moved. With respect to these relationships, if the moving amount of the movable base table 2 is taken as $\gamma$ and the moving amounts of the contact portions of the respective belts 25a and 25b in the same direction are taken as $\beta 1$ and $\beta 2$ respectively, the moving amount $\gamma$ of the base table 2 is expressed by the equation below.

$$\gamma = \tfrac{1}{2}(\beta 1 + \beta 2)$$

The moving amounts of both the belts 25a and 25b per one pulse of the first and second pulse motors PM1 and PM2 are selected different. If the diameters of the pulleys 16 and 17 are made different from each other such that with respect to the moving amount "1" of the belt 25a per one pulse of, for example, the first motor PM1, the moving amount of the belt 25b per one pulse of the second pulse motor PM2 may become 0.8, the moving amounts of both the belts 25a and 25b per one pulse can be presented as 1:0.8. As a result, when only the first pulse motor PM1 is rotated, th moving amount of the movable base table 2 becomes as $$\gamma = \tfrac{1}{2} \cdot \beta 1 = 0.5 \cdot \beta 1$$

While, when only the second pulse motor PM2 is rotated, the moving amount $\gamma'$ becomes as $$\gamma' = \tfrac{1}{2} \cdot 0.8 \cdot \beta 1$$

Accordingly, when both the first and second pulse motors PM1 and PM2 are rotated in the same direction (this means that the portions of the belts 25a and 25b at which they contact with the pulley 12 are moved in the same direction), the moving amount $\gamma''$ ofthe movable base table 2 per one pulse is given as by the following equation.

$$\gamma'' = \tfrac{1}{2}(\beta 1 + 0.8 \cdot \beta 1) = 0.9 \cdot \beta 1$$

When the second pulse motor PM2 is driven to rotate by one pulse amount in the reverse direction, the moving amount $\gamma'''$ of the movable base table 2 becomes as $$\gamma''' = \tfrac{1}{2}(\beta 1 - 0.8 \cdot \beta 1) = 0.1 \cdot \beta 1$$

Thus, the moving amount of the movable base table 2 can be varied as 0.1, 0.4, 0.5, 0.9, or 1:4:5:9 with respect to the pulse driving of the pulse motor.

While in the afore-said embodiment the difference of the moving amount of the movable base table 2 per one pulse of the pulse motor can be realized by making the diameters of both the pulleys 16 and 17 different, it is possible to realize this by combining step motors having different step angles.

While in the afore-said embodiment the moving amounts of the movable base table 2 by the step motors are presented as 1:0.8, if the moving ratio is selected as 2:3, the moving amount of the movable base table 2 can be varied as 1:2:3:5. These relationships are shown in FIG. 22.

Figure 22:
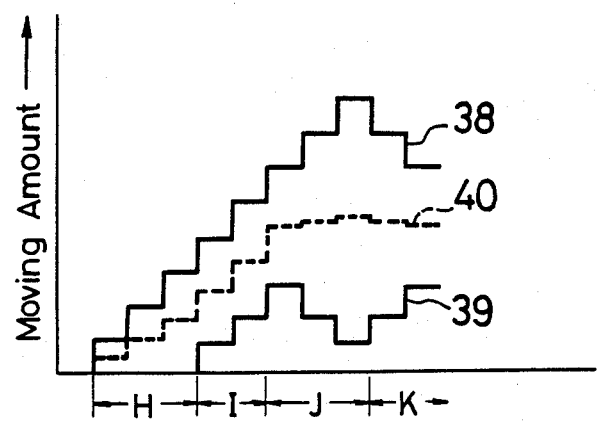
FIG. 22 is a diagram showing a moving amount of a movable base table relative to a combination of pulse motors of the invention.

In FIG. 22, the ordinate indicates the moving amounts of the pulse motor and the movable base table 2 while the abscissa indicates which direction the first and second motors PM1 and PM2 are rotated during the interval from H to K. Specifically, during the interval H, only the first pulse motor PM1 is rotated as shown by a solid line 38; during the interval I, the first and second pulse motors PM1 and PM2 are rotated in the same direction as shown by the solid lines 38 and 39; during the interval J, the second pulse motor PM2 is rotated in the reverse direction; and during the interval K, the moving amounts of the belts 25a and 25b are indicated where the first pulse motor PM1 is rotated in the reverse direction. In FIG. 22, a dotted line 40 indicates the moving amount of the movable base table 2 as the belts 25a and 25b are moved.

When the movable base table 2 is moved at high speed as mentioned above, the pulse motors PM1 and PM2 are rotated in the same direction; while, when the optical pick-up approaches a desired position, one of the pulse motors PM1 and PM2 is rotated in the reverse direction so that the moving amount per one pulse is reduced and hence it is possible to increase the resolution in the movement of the movable base table 2. Further, in the normal playback mode, it is possible to control the optical pick-up to move at a fine feeding pitch.

Figure 23:
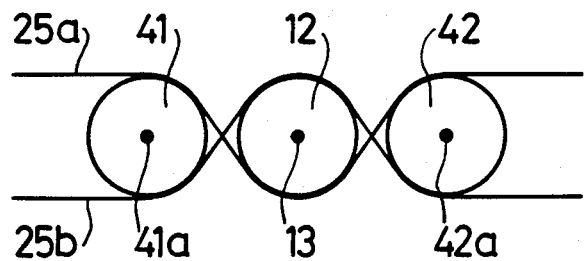
FIG. 23 is a schematic diagram of a differential driving system of a still further embodiment of the optical system moving apparatus according to the invention.

FIG. 23 is a schematic block diagram showing further embodiment of the optical system moving apparatus according to the present invention. In this embodiment, referring to FIG. 23, instead of the tension rollers R1 and R2 used in the above embodiment, in order to increase the wrapping angles at which the belts 25a and 25b are wound around the pulley 12, there are provided pulleys 41 and 42 to sandwich the pulley 12 therebetween and the belts 25a and 25b are alternately wound around the pulleys 41, 12 and 42.

Figure 24:
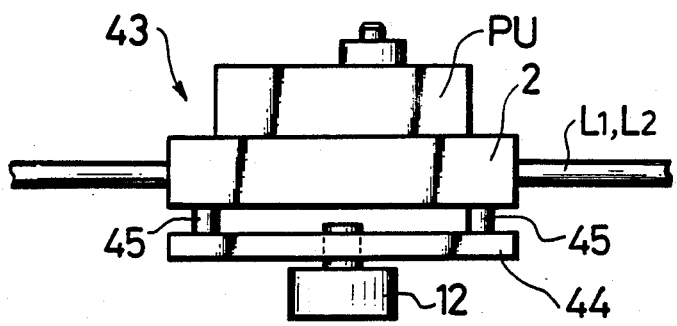
FIGS. 24 and 25 are respectively schematic diagrams of differential driving systems used in yet a further embodiment of the optical system moving apparatus according to the invention.

Of course, one of the pulleys 41 and 42 may be removed. When these pulleys 41, 12 and 42 aee driven to rotate, both the pulse motors (not shown) are rotated in the reverse direction (the moving directions of the belts 25a and 25b in contact with the pulley 12 are reversed from each other). Accordingly, when the movable base table 2 (see FIG. 21) is moved at a small feeding pitch, if the timings at which both the pulse motors are rotated are made different very slightly, there is a fear that the movable base table 2 will be vibrated. Therefore, as shown in FIG. 24, it is proposed that between the movable base table 2 on which the optical pick-up PU is mounted and a base table 44 to which the pulley 12 of the differential drive system 43 is fixed, there is provided a cushion material 45 to thereby form a mechanical filter. According to this mechanical filter, the movable base table 2 can be moved smoothly and the servo-control can be carried out with high precision.

Figure 25:
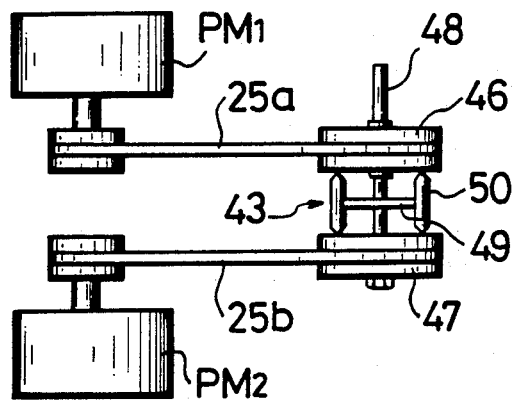

FIG. 25 is a schematic diagram showing a yet further embodiment of the optical system moving apparatus according to this invention. In this embodiment, the differential driving system 43 is provided independently. Referring to FIG. 25, by the first and second pulse motors PM1 and PM2, pulleys 46 and 47 are rotated through the belts 25a and 25b.

A central shaft 48, which is common to the pulleys 46 and 47, is a rotatable output shaft. To the output shaft 48, there are pivotably mounted rollers 50 and 50 through a lateral shaft 49 so as to be freely rotatable. These rollers 50 and 50 are respectively made in contact with the external peripheral portions of the pulleys 46 and 47 and thereby rotated so that the rotation of the rotary shaft 48 is made corresponding to the sum of the rotations of the pulleys 46 and 47. While, the pulleys 46 and 47 are set in a differential relation and are operated similarly as in FIG. 21.

According to the present invention as set forth above, it is possible to provide the optical pick up moving apparatus employing tw pulse motors of substantially the same arrangement, in which the driving directions of both of them are varied, the pulse is turned ON and Off and the driving pitch is varied so that the movable base table can be moved at high speed and with high precision.

According to the present invention, since the movable base table is gradually stopped moving by increasing the driving speed of one motor and the returning of the movable base table or the like can be carried out when the speed of one motor becomes faster than that of the other motor, the motor is not required to be stopped and the motor can be continuously controlled to be operated, thus the stability can be improved significantly.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. An optical system moving apparatus comprising:
   (a) first and second driving motors;
   (b) driving means for driving said first and second driving motors simultaneously;
   (c) first and second transmitting means coupled to said first and second driving motors for transmitting outputs from said first and second driving motors, respectively;
   (d) a moving table carrying thereon an optical system;
   (e) coupling means rotatably supported on said moving table and coupled to said first and second transmitting means for coupling outputs from said first and second transmitting means to said moving table, whereby said moving table is driven by said first and second driving motors through said first and second transmitting means and through said coupling means.

2. An optical system moving apparatus according to claim 1, in which the driving ratio between said first and second driving motors is varied by changing the level of a voltage applied to at least one of said first and second driving motors.

3. An optccal system moving apparatus as claimed in claim 1, in which the rotating direction of at least one of said first and second driving motors is changed by changing the polarity of a voltage applied thereto.

4. An optical system moving apparatus according to claim 1, in which each of said first and second transmitting means is coupled in a cantilever fashion.

5. An optical system moving apparatus as claimed in claim 1, in which each of said first and second transmitting means comprises a screw driven by said first and second driving motors, respectively, and said couping means is a worm gear wheel meshed between said two screws.

6. An optical system moving apparatus according to claim 1 further comprising means for detecting a rotation speed of one of said first and second driving motors and for generating a detected voltage, and means for comparing said detected voltage with a reference voltage and for controlling the rotation of said one driving motor in response to such comparison.

7. An optical system moving apparatus according to claim 1, in which said first and second driving motors each include a pulse motor.

8. An optical system moving apparatus according to claim 1, in which said first and second driving motors are driven at the same speed and in the opposite direction by said driving means so as to stop said table.

9. An optical system moving apparatus according to claim 1, in which each of said transmitting means is fixed at both ends thereof.

10. An optical system moving apparatus according to claim 1, in which both of said transmitting means together include a plurality of pulleys and wires.

11. An optical system moving apparatus according to claim 1, in which both of said transmitting means together include first, second, third and fourth pulleys in association with said first and second driving motors, said moving table includes a fifth pulley rotatably engaged with a rotary shaft implanted on said moving table and an endless belt wound around said fifth pulley and said first to fourth pulleys.

12. An optical system moving apparatus according to claim 1, in which one of said first and second driving motors is mounted on said moving table.

13. An optical system moving apparatus according to claim 5, in which one of said screws serves also as a guide rail for said moving table.

* * * * *